United States Patent [19]

Davidson

[11] 4,284,013
[45] Aug. 18, 1981

[54] PALLET COUPLING APPARATUS

[75] Inventor: Robert W. Davidson, Virginia Beach, Va.

[73] Assignee: CFE Air Cargo, Inc., Norfolk, Va.

[21] Appl. No.: 10,503

[22] Filed: Feb. 8, 1979

[51] Int. Cl.³ .......................................... A47B 35/00
[52] U.S. Cl. ................................... 108/50; 213/75 R
[58] Field of Search ............... 248/346, 509; 403/316, 403/317, 321, 323, 406, 408; 213/75 R, 75 M, 172; 24/221 K; 108/50, 64; 292/59

[56] References Cited

U.S. PATENT DOCUMENTS

| 874,083 | 12/1907 | Jonah | 24/221 K |
|---|---|---|---|
| 3,643,603 | 2/1972 | King | 213/75 R |
| 3,703,870 | 11/1972 | Walton | 108/50 |

FOREIGN PATENT DOCUMENTS 695125  9/1965  Italy .......................................... 108/64

Primary Examiner—William H. Schultz

[57] ABSTRACT

Coupling apparatus for releasably interconnecting cargo pallets to form trains thereof for transporting exceptionally long cargo usually co-mingled with cargo of more normal dimension. Such apparatus is operative to preserve the trainlike arrangement of such pallets, one to another, throughout movement over, and transfer between, various conveying apparatuses customarily employed for the handling of said pallets even though the apparatuses may be misaligned, one to the other, either laterally, vertically or angularly or combinations thereof. The coupling apparatus is particularly adaptable to pallets framed by extruded members having a plurality of spaced apart symmetrically distributed recesses formed therein and, in coacting relationship with alternate recesses, a plurality of hingedly mounted securing rings. The coupling apparatus is provided with a body portion which is adapted to engage the outer edges of the frame and the inner edges of the recesses in key-like arrangement thereby holding adjacent pallets in spaced apart alignment, and is further provided with projections adapted to engage the coacting securing rings of the adjacent pallets thereby preventing the pallets from separating, and a locking portion which is operative to prevent disengagement of the securing rings.

8 Claims, 9 Drawing Figures

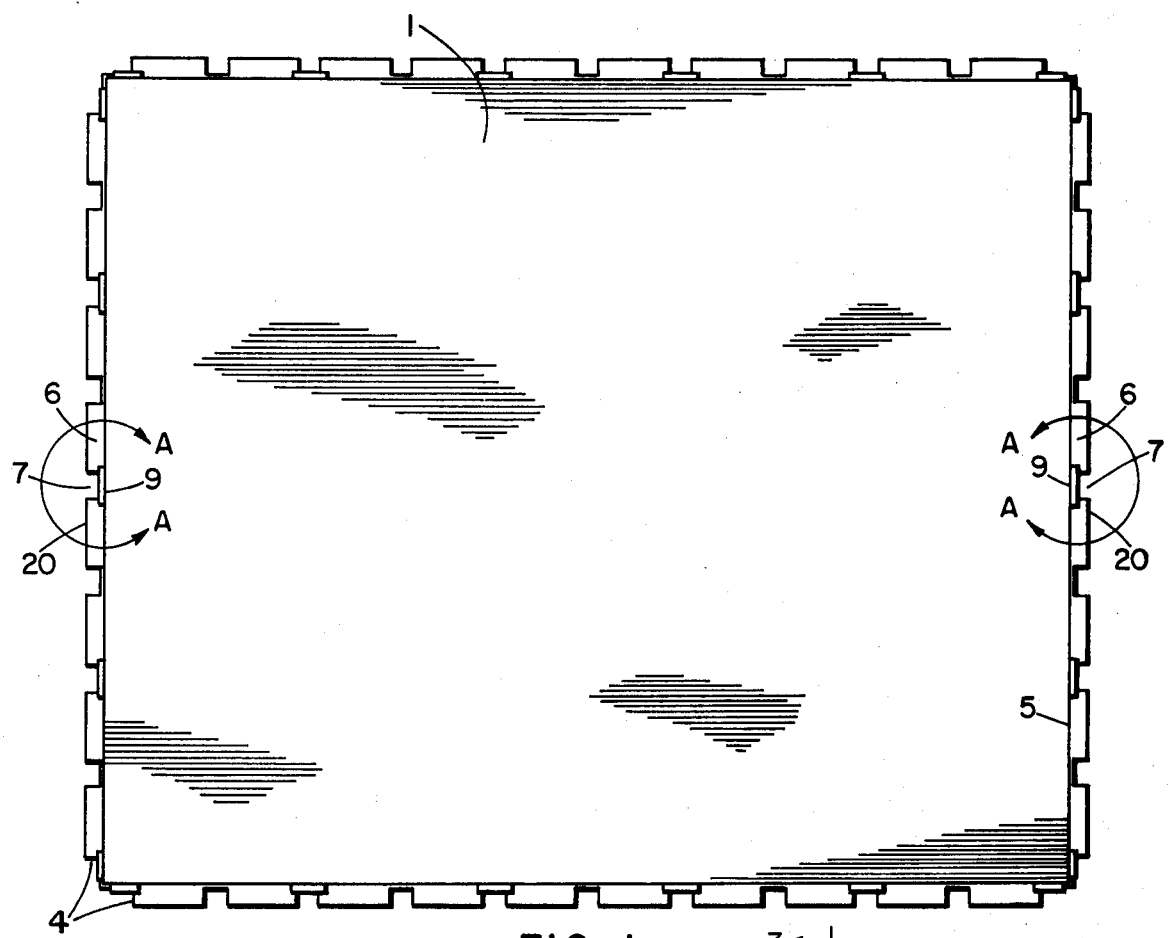
FIG. 1
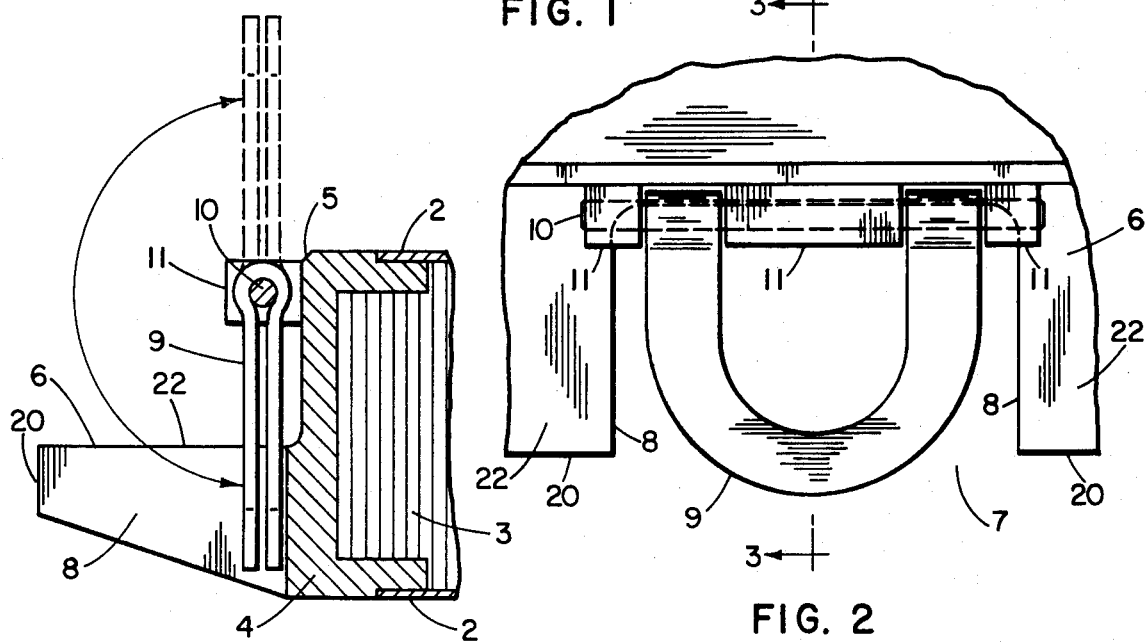
FIG. 3
FIG. 2

PALLET COUPLING APPARATUS

This invention relates to cargo handling apparatus and more particularly to improvements in apparatus which is operative to releasably interconnect cargo pellets for the purpose of forming trains thereof for use in transporting cargo having dimensional characteristics of such magnitude as to require support by a plurality of pallets during shipment.

The invention finds application in all types of cargo carrying vehicles such as trucks, railroad cars and ships but more particularly in large cargo carrying aircraft of the type which are provided with conveyerized cargo handling apparatus so constructed as to facilitate the rapid loading and securing of cargo through the use of large load bearing pallets which are adapted with means to secure cargo thereon and which are further adapted to be moved freely along the conveyerized cargo handling apparatus to pre-selected, tandemly arranged locations within the aircraft and to be restrained therein against unwanted movement during flight by latching devices affixed to the cargo handling apparatus. Such apparatus is further described in my U.S. Pat. Nos. 3,204,581; 3,262,588; 3,288,411; 3,312,181 and 3,390,752 and, as related to the present invention, more particularly described in my U.S. Pat. No. 3,251,489 which discloses the conveyerized cargo handling apparatus as it would be installed in a cargo aircraft having a large opening in the tail portion of the aircraft through which palletized cargo may be loaded or unloaded. While not necessarily limited thereto, the present invention finds greater value in this type of aircraft since such aircraft are adapted to permit straight-in loading of exceptionally long pieces of cargo.

While there are many types of pallets being used in systems of the aforedescribed type, the pallets with which the present invention finds greatest use is typified by the standard military type pallet known as the 463L pallet and by its commercial counterpart identified as configuration 1B6 in National Aerospace Standard (NAS) 3610.

These pallets typically have a load bearing surface approximating 7 feet by 10 feet and are so constructed as to be capable of bearing loads ranging up to 10,000 lbs. in weight and 550 cubic feet in volume on a single pallet and are provided with securing rings spaced uniformly around their periphery to which cargo nets, straps, chains and the like may be attached for the purpose of securing cargo firmly in position thereon. The pallet is further provided with a ledge extending around the periphery at a level just beneath that of the aforementioned securing rings. This ledge, which is typically in the form of a metal extrusion of very high strength adapted to coact with the securing rings, is provided with rectangularly shaped, vertically disposed recesses located in spaced apart arrangement with alternate recesses being located directly beneath each of the securing rings. The ledge and rectangularly shaped recesses are so arranged as to coact with the various forms of latching arrangements that are provided in the several aircraft types equipped with pallet handling and restraining apparatus as heretofore described.

Customarily, the transportation industry in which the above described cargo aircraft is employed is provided with other forms of conveyerized apparatus which are operative to perform the ground handling functions associated with the preparation and loading of cargo. Typically the warehouses and terminals in which the cargo is received and processed are provided with stationary conveyerized platforms upon which pallets are placed while cargo is being stacked and secured thereon. These platforms are typically sized to accommodate a plurality of pallets in tandem arrangement and are provided, on their upper surfaces, with a plurality of spaced axle mounted rollers so adapted as to permit the said pallets to be moved freely along the supporting surface of the said platform in a longitudinal direction. The platforms customarily are further provided with guide means affixed in parallel arrangement to each longitudinal side, such guide means being operative to restrict pallets to longitudinal movement. The platforms are further provided with a plurality of stop members which are releasably operable to permit the arrestment of pallets in selected positions along the supporting surface of the said conveyerized platform. The platforms are adapted on at least one end to permit pallets to be removed therefrom or to be moved thereon as by a lateral transfer from or to a similarly adapted conveyerized surface.

In the cargo handling operation being described, another type of apparatus is customarily provided for the purpose of moving palletized cargo in and about the warehouse and the aircraft parking ramp. Such apparatus is typically in the form of a self-propelled vehicle which is adapted to transport a plurality of loaded pallets in tandem arrangement between the aforedescribed palletizing platforms, the parked aircraft, and/or between said aircraft and conveyerized apparatus of similar construction to the aforedescribed loading platforms commonly known as storage racks or hi-line docks. The load bearing surface of the transporting apparatus is typically provided with a plurality of spaced axle mounted rollers so adapted as to permit pallets to be moved freely therealong in the longitudinal direction. This conveyerized load bearing surface is typically further provided with guide means affixed in parallel arrangement to each longitudinal side which is operative to restrict pallets to longitudinal movement. The conveyerized load bearing surface is further provided with a plurality of stop members which are releasably operable to permit the arrestment of pallets in selected positions on the conveyerized load bearing surface. The transporting apparatus is also typically provided with means which is operable, by election, to mechanically propel loaded pallets along the conveyerized load bearing surface, and is further typically adapted to receive or discharge palletized cargo as by a lateral transfer to or from a similarly provided conveyerized surface at either end of the apparatus, such receipt or discharge of cargo being accomplished through either the use of the heretofore described mechanical propulsion apparatus or by manual manipulation by a group of workmen. The conveyerized load bearing surface is also typically adapted to be raised or lowered by mechanical means so as to compensate for differences in elevation which are frequently encountered between the load bearing surface of the said transporting apparatus and apparatus from and/or to which pallets are to be transferred.

In the air cargo transportation system of the type herein described, cargo can be received at a flight originating point, comingled with other cargo according to common flight destinations, placed on large load bearing pallets and secured thereto in preparation for being finally loaded aboard a cargo aircraft; and, upon arrival of the aircraft, being transported from the position of loading or from a position of interim storage to the waiting aircraft, there to be loaded into the aircraft and rapidly secured therein by a locking means affixed to the aircraft conveyer system which is adapted to coact with the peripheral ledge of the load bearing pallets at prescribed locations so as to assure that the pallets and hence the cargo secured thereto will not shift during subsequent ground or flight maneuvers.

In the air cargo transportation industry, the use of such systems produces several significant economic advantages. Such advantages result from the fact that the cargo aircraft is not required to be parked on the ramp at the loading point while individual pieces of cargo are being loaded thereon and while the consolidations of individual pieces of cargo are being secured therein as is the case with aircraft which are not equipped with mechanical systems adapted to receive large units of pre-consolidated and pre-secured cargo. Considering that each pallet can accommodate as much as 10,000 lbs. of cargo and that the loading and securing of a pallet can be accomplished in as little as two minutes, it can be readily appreciated that an aircraft which has been provided with the pallet handling system heretofore described need spend little time being loaded or unloaded and hence can be utilized for flying cargo for a substantially greater number of hours per day, thereby bringing about a significant increase in its ton-mile productivity as well as an increase in productive utilization of its highly paid operating crew.

The use of such systems further adds to the ton-mile productivity since they permit a substantially greater amount of cargo to be loaded into the aircraft than would otherwise be expected without such a system. This is due to the fact that under Federal Airworthiness Regulations all cargo being transported in aircraft of the type being discussed must be restrained against adverse movement or breakaway resulting from inertial forces of up to nine times gravity (9g.). These regulations and adherence thereto are necessary in order to protect the aircraft from becoming disabled while in flight as a result of damage to internal control apparatus (e.g., hydraulic lines, cables, etc.) caused during periods of turbulence by loose or shifting cargo, and to protect the operating crew of the aircraft from injury or death as a result of cargo breaking loose and becoming missile during a ditching or a survivable crash landing. The required restraint may be provided by chains, straps, rope or the like but it is more customary to employ large cargo nets which are adapted to enclose consolidated cargo and to be secured at the nets' lower peripheral edges to securing rings located in spaced apart arrangement surrounding the consolidated cargo. In a cargo aircraft which is not provided with the aforedescribed pallet handling system, the aforesaid securing rings are customarily affixed to the floor of the aircraft and a substantial amount of floor area must be dedicated as aisles in order to permit access for workmen to attach or detach the aforedescribed nets. On the other hand, the securing rings in a pallet adapted system are affixed to the peripheral edge of the pallet and the securing of the aforedescribed net is accomplished outside of the aircraft where there is ample room for workmen to maneuver. The final securing of the cargo within the aircraft is accomplished by apparatus adapted to engage and secure the peripheral ledges of the pallets and hence the cargo net which is secured in coacting arrangement therewith without requiring access aisles for workmen. In fact, in a typical modern cargo aircraft having a pallet handling system of the type described, it is customary for the spacing between adjacent ledges of loaded and secured pallets to be as little as two (2) inches to allow only for the space normally occupied by latching devices which coactively engage the ledges of consecutively loaded pallets. In one form of system, for example, the latching devices are adapted such that it is only necessary to activate the latching devices at the rearward ledge of each pallet as it is loaded, since, when in the operative mode, the latching devices are adapted to receive the forward ledges of the pallets into an engaged and secured condition as they are sequentially moved into their respective positions. Workmen are hence never obliged to perform functions that would require them to have access to areas between netted cargo, and the aforedescribed dedicated aisle space can thus be more gainfully utilized for the transportation of additional cargo.

The use of the aforedescribed cargo pallets together with the various apparatus which are adapted to handle them, have met with great success to the end that significant gains have been made in reducing the cost of air transportation of cargo. This reduction in cost has resulted in a substantially greater variety of material becoming economically eligible for air shipment than was experienced prior to the advent of systems such as those herein described. Significant in this increase in variety has been the introduction of cargo which is substantially longer than the cargo pellets which are commonly employed in the air cargo transportation industry in which modern apparatus of the type described has been incorporated. The excessively long cargo is characterized by such items as vehicles, aircraft wing spars, engines, power generating equipment, helicopter rotor blades, ships propeller shafts, components for prefabricated structures and the like.

When such excessively long cargo is presented for air transport, it becomes encumbent upon the aforesaid industry to comingle the said long cargo with cargo of more normal dimension in order to preserve the integrity of rapid loading and securing, space utilization, and payload density which is inherent in the employment of apparatus of the aforedescribed type. Hence a means of interconnecting the aforedescribed pallets in trainlike formation of sufficient length to accommodate the aforesaid long cargo is required. This coupling of pallets must be such as to assure that a plurality of pallets, when coupled and loaded with comingled long and normal size cargo, will remain in secure trainlike arrangement throughout the time that the said coupled and loaded pallets are transferred to and from the aforedescribed conveyerized loading, storage and transporting apparatus; and further to remain in secure trainlike arrangement upon being subsequently maneuvered into position on board the aircraft so that the ledges of the pallets are in pre-established coacting relationship with the appropriate aforedescribed latching devices.

Attempts have been made heretofore in the art to provide satisfactory apparatus for interconnecting pallets in trainlike formation for comingling and transporting long and normal size cargo. These attempts comprise such apparatus as wood or metal spacer blocks used in conjunction with conventional chain placed over the aforesaid spacer blocks and interlaced through the aforedescribed securing rings affixed to the peripheral edge of tandemly arranged pallets, spacer blocks used in conjunction with conventional spring biased cable sections secured, as by hooks, to the securing rings of adjacent tandemly arranged pallets, and spacer blocks provided with projections over which pallet securing rings of tandemly arranged pallets are placed and thence overlapped with a spring biased member tending to restrict the said ring from becoming disengaged thus permitting the entrained pallets to become disconnected, a typical apparatus of the latter type being disclosed in U.S. Pat. No. 3,643,603 dated Feb. 22, 1972. These attempts have been less than successful and as often as not have resulted in aircraft delays causing a loss of aircraft and crew utilization, occasioned by the need for reworking loaded pallet trains resulting from the said pallets becoming disconnected and/or misaligned during their transfer from one conveyerized apparatus to another or from a conveyerized apparatus to the aircraft. Indeed, until the advent of the present invention, no known apparatus has successfully met the requirements of the U.S. Air Force that pallet coupling apparatus be capable of preserving a predetermined spaced apart, aligned relationship between as many as five interconnected loaded pallets after having undergone such rigorous maneuvers as:

a. being transferred from one horizontal conveyerized surface to another with as much as a two and one-half inch vertical displacement in the form of an abrupt drop, from one surface to another, b. being transferred from one conveyerized surface to another with the said conveyerized surfaces being angularly misaligned from the horizontal plane such as to form a crest of as much as eight inches measured vertically at their juncture, c. being transferred from one conveyerized surface to another with the said conveyerized surfaces being angularly misaligned from the horizontal plane such as to form a valley of as much as eight inches measured vertically at their juncture, d. being transferred from one horizontal conveyerized surface to another with the said other conveyerized surface being misaligned from the horizontal plane in a lateral direction, as in twist, by as much as two inches measured over the width of a pallet, and e. being transferred from one horizontal conveyerized surface with the said other conveyerized surface being misaligned as in d. above with an attendant angular misalignment from the longitudinal horizontal plane of eight inches measured vertically over the length of a five pallet train thus forming a simultaneous twist and crest between the said conveyerized surfaces.

These maneuvers and the adverse forces related thereto typify the environment in which pallet coupling apparatus is employed and hence summarize the problem which must be solved. After satisfactorily so testing apparatus embodying the invention, the U.S. Air Force has approved apparatus embodying the invention as a standard item for use within its Air Logistics System.

It is thus a general object of the invention to provide means for coupling cargo pallets in trainlike arrangement for the purpose of transporting excessively long pieces of cargo, whereby the entrained pallets will be secured in a predetermined aligned and spaced apart relationship against all adverse forces tending to destroy the said relationship.

It is a related object of the invention to provide a means whereby a plurality of cargo pallets may be arranged in aligned, spaced apart relationship, coupled together in trainlike formation, and, after having cargo loaded and secured thereto, moved along conveyerized apparatuses and transferred therebetween, to be loaded aboard a conveyerized cargo aircraft and secured therein for flight without becoming uncoupled, misaligned or altered with respect to their original spaced apart relationship as a result of their being subjected to adverse vertically disposed, longitudinally disposed, and laterally disposed forces or combinations thereof.

It is a further object of the invention to provide a simple pallet coupling apparatus which can be expeditiously assembled to pallets to form trains thereof without the use of tools or other mechanical aids.

Stated generally these and other objects are achieved by providing a lightweight coupling apparatus which can be readily assembled to adjacent tandemly arranged cargo pallets to form a train thereof wherein the body of the said apparatus is provided with spaced apart abutting surfaces disposed in parallel, oppositely facing arrangement adapted to coact with the facing surfaces of the laterally disposed ledges of the aforesaid tandemly arranged pallets thereby preventing the said pallets from adopting a position of longitudinal proximity, one to another, of less than a predetermined amount, and wherein the said body is also provided with aligned, oppositely extending projections arranged to coact with the longitudinally disposed, inwardly facing surfaces of the recesses formed in the ledge portions of the said tandemly arranged pallets thereby restricting lateral displacement of the pallets by more than a predetermined amount, and wherein the body portion of the apparatus is also provided with a pair of vertically disposed projections around which securing rings affixed to opposing peripheral edges of the said adjacent tandemly arranged pallets are positioned, thereby restricting the pallets from longitudinal displacement, one to another, of more than a predetermined amount, and wherein the body portion is further provided with a pivotally supported locking dog adapted, when in operative position, to overlay and capture the securing rings thus preventing their unwanted release when the pallets are subjected to conditions which tend to displace them, one from the other, in a vertically disposed direction.

In order that the manner in which the foregoing and other objects of the invention are attained can be understood in detail, a particularly advantageous embodiment thereof will be described with reference to the accompanying drawings in which like characters of reference indicate the same or like parts, and wherein:

FIG. 1 is a plan view of a preferred form of pallet used in the practice of the invention.

FIG. 2 is an enlarged view of a detail shown in FIG. 1 at A—A.

FIG. 3 is a sectional view of an enlarged detail of FIG. 1 taken on line 3—3 of FIG. 2.

Figure 4:
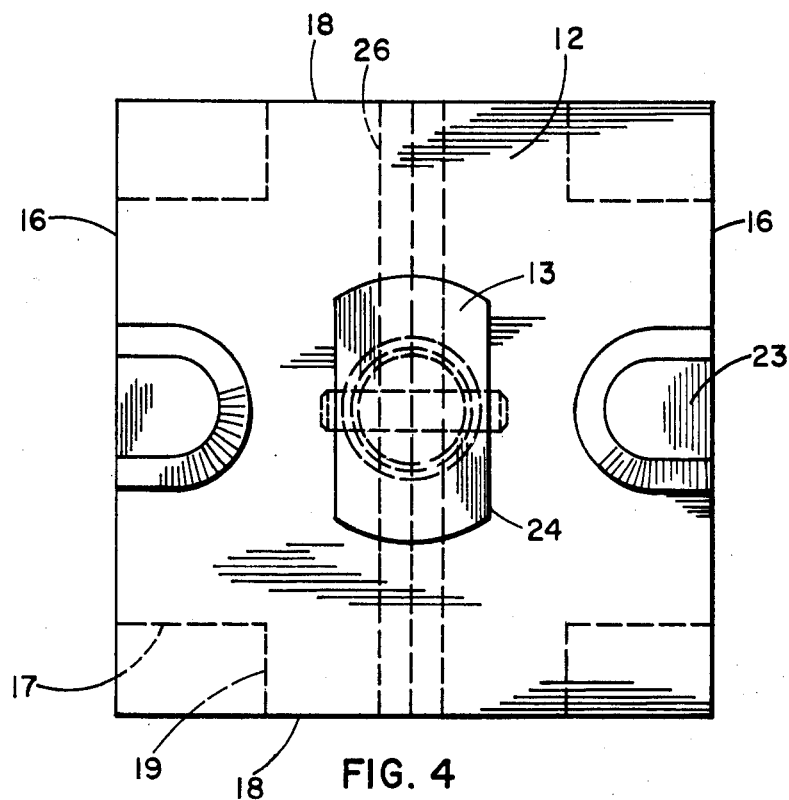
FIG. 4 is a plan view of a coupling apparatus embodying the invention showing the locking dog portion in inoperative position as it would normally be disposed in readiness for assembly to pallets.

The coupling of pallets to form trains thereof employing apparatus embodying the invention may be accomplished with a single apparatus at each juncture, preferably located on the longitudinal center line of the pallet train, or with a plurality of apparatuses at each juncture preferably located symmetrically about the longitudinal center line of the pallet train, depending on the loads which are anticipated by those making use of the invention. For purposes of illustration the apparatus is shown herein as a single unit as it would be adapted between any two tandemly arranged pallets at complementary locations indicated as A—A in FIG. 1, wherein the said pallets are identified by reference numerals 1 and 1'.

FIGS. 1, 2 and 3 illustrate a preferred form of pallet 1 used in the practice of the invention as it is typically constructed. It is comprised of upper and lower panels 2 of high strength aluminum with a core 3, generally comprised of end grain balsa wood, securely bonded therebetween. The pallet 1 is framed on each of its four sides by extruded aluminum members 4 normally secured thereto by high strength thermosetting adhesive of a type commonly used in aircraft construction. The extruded members 4 are further securely interconnected at each of their intersecting four corners by rivets or dowels (not shown) thus providing a coating rigid frame structure surrounding the bonded core 3 and panels 2 thereby forming a composite pallet 1 having high load capacity and great structural strength. The extruded members 4 are so formed as to provide an upper edge portion 5 and a ledge portion 6. The said ledge portion 6 is provided with rectangular recesses 7 uniformly spaced on all four sides and arranged symmetrically outward from the mutually perpendicular center lines of the pallet 1. The recesses 7 are customarily provided in the pallet to coact with latching devices in certain types of aircraft and are formed, as by milling, to a high degree of accuracy and provide, by virtue of their shape and surrounding structure, pairs of vertically disposed, inwardly facing abutting surfaces 8 having exceptionally high strength.

The upper edge portion 5 is provided with a plurality of hingedly mounted ring members 9 supported by pintles 10 and gudgeon members 11. The said gudgeon members are affixed to the edge portion 5 by riveting or welding in such location that the rings 9 are arranged directly above and in coacting relationship with recesses 7 at alternate symmetrically spaced locations (FIG. 1). The ring members 9 are customarily provided as a securing means for cargo restraining devices such as nets or the like and also exhibit exceptionally high strength.

Neither the recesses 7 nor the coacting securing rings 9 are required for their customary uses when they are disposed between adjacent tandemly arranged pallets 1 and 1' which are to be connected for purposes of forming a train. Since the securing rings 9 and the surfaces 8 of recesses 7 possess both high strength and dimensional predictability, and are available, they are used to advantage in the practice of the present invention as will be shown.

Figure 5:
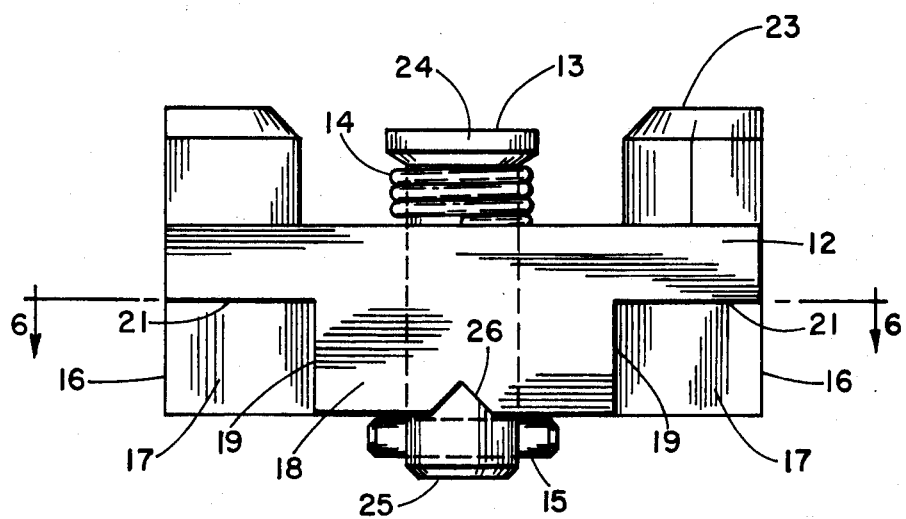
FIG. 5 is a side elevation view of the apparatus as shown in FIG. 4.

FIG. 4 and 5 illustrate, respectively, a plan view and an elevation view of a preferred form of apparatus embodying the invention. The apparatus is comprised of a generally square shaped body portion 12, a rotatably mounted, generally T-shaped locking dog 13, a compression spring 14 and a cylindrical key 15. The body portion 12 is fabricated preferably by diecasting, of a material such as an aluminum alloy selected primarily for lightweight combined with high tensile and bearing strength.

Figure 6:
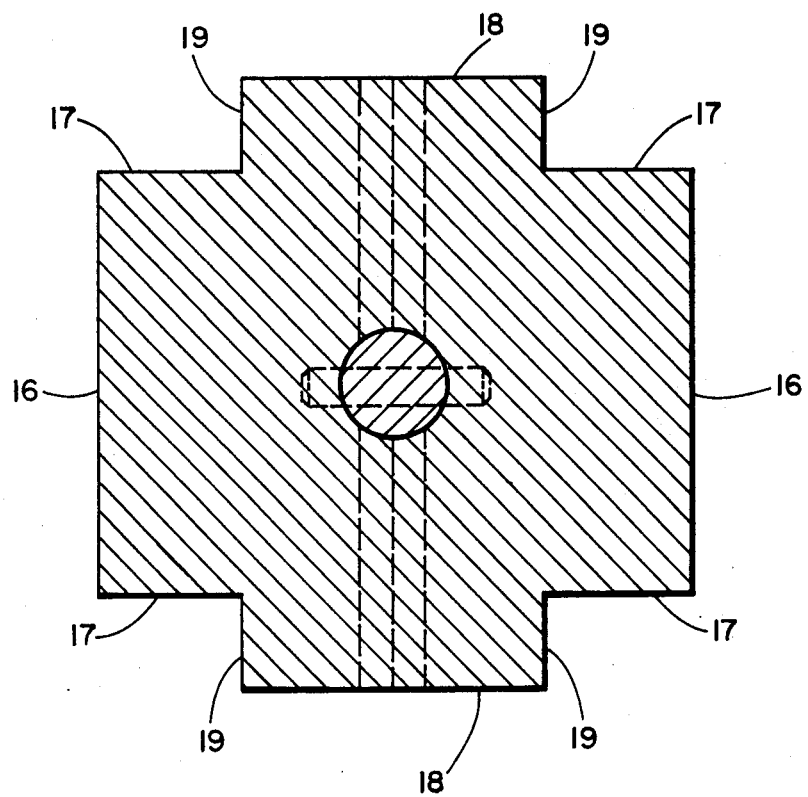
FIG. 6 is a sectional view taken on line 6—6 of FIG. 5.
Figure 7:
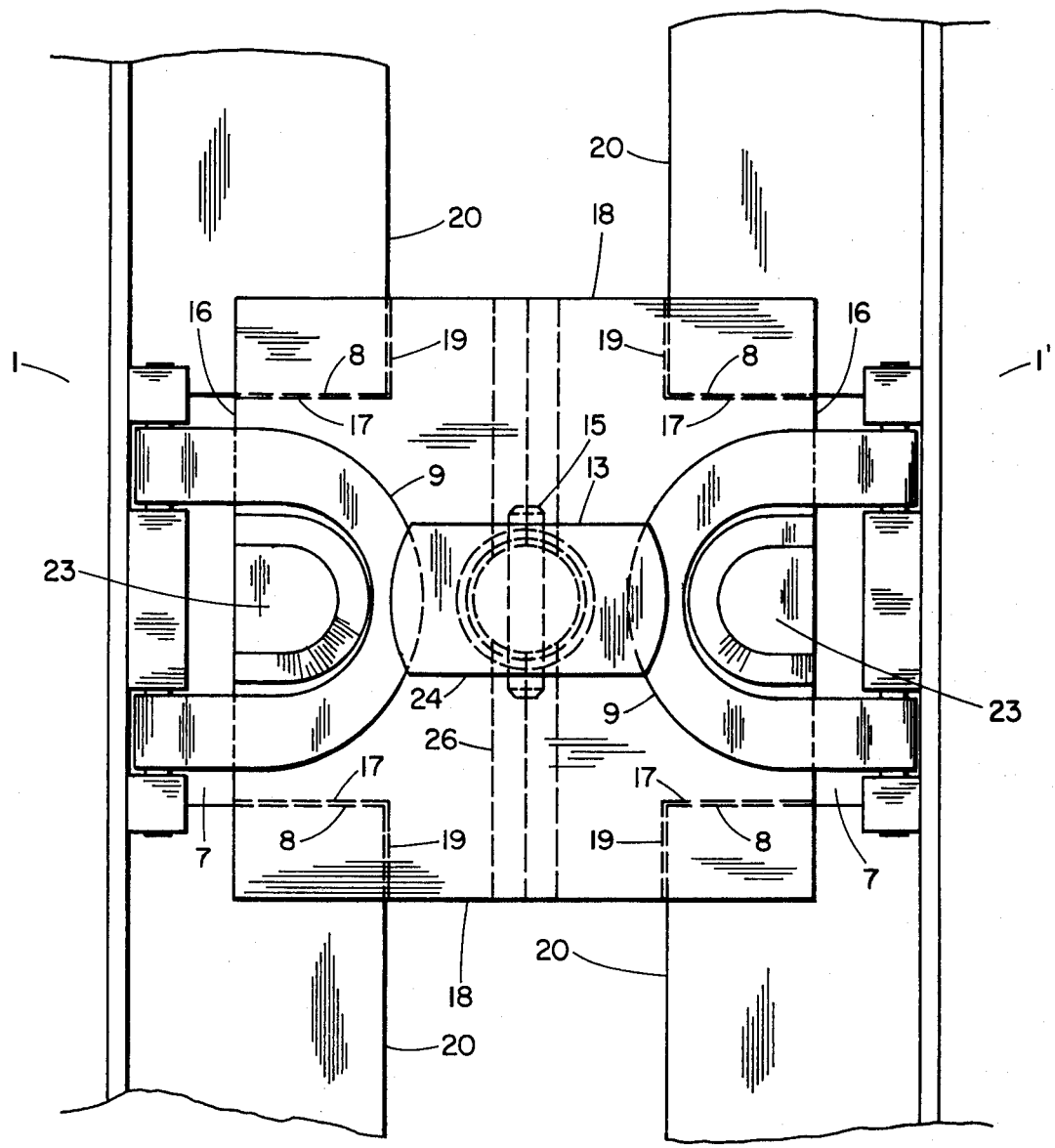
FIG. 7 is a plan view of the said apparatus (shown with the locking dog portion disposed in operative position) as it would normally be employed in the coupling of pallets of the type shown in FIG. 1.

Referring to FIG. 6 which is a sectional view of body portion 12 taken on line 6—6, it will be seen that the body portion 12 is so formed as to provide on its underside a pair of oppositely extending projections 16 each having a pair of parallel oppositely facing abutting surfaces 17 which are adapted to coactively engage surfaces 8 of recesses 7 formed in the ledge portions of pallets 1 and 1' (FIG. 7) and, arranged perpendicularly to projections 16, a second pair of oppositely extending projections 18, each projection also having a pair of parallel oppositely facing abutting surfaces 19 which are adapted to engage the outer edges 20 of the ledge portions 6 of pallet 1 and 1' immediately adjacent to surfaces 8 at each side of recesses 7 (FIG. 7).

Referring back to FIGS. 4 and 5, surfaces 21, which are formed at each of the four corners of body 12 in conjunction with, and in mutually perpendicular arrangement to abutting surfaces 17 and 19, are adapted to rest on the upper surfaces 22 of the ledge portion 6 to maintain projections 16 and 18 in a preferred operative relationship with pallets 1 and 1'. This relationship is disclosed more fully in FIGS. 7 and 8 wherein it will be noted that projections 16 are inserted into recesses 7 of aligned tandemly arranged pallets 1 and 1' so that surfaces 17 of the body portion 12 abut the inwardly facing surfaces 8 of recesses 7, and surfaces 19 of projections 18 abut the facing outer edges 20 of ledges 6, with both projections 16 and 18 being maintained in their preferred operative position by surfaces 21 which rest on the upper surfaces 22 of ledges 6.

Referring back to FIGS. 4 and 5, body portion 12 is provided also with lugs 23 which extend upwardly from body portion 12 on a common longitudinal center line located between surfaces 17 of projections 16. The upwardly projecting lugs 23 are adapted to permit the hingedly mounted securing rings 9 (FIG. 3) to be placed thereover when the body portion 12 is placed in operative position on pallets 1 and 1' (FIGS. 7 and 8) while the locking dog 13 is disposed in inoperative position as shown in FIG. 4.

The locking dog 13 is comprised of an elongate head portion 24 and a cylindrical shank portion 25. The shank portion 25 is inserted through a suitable hole formed as by drilling in the body portion 12 at a point midway between the upwardly extending lugs 23. The shank portion 25 is so formed and fitted as to enable the locking dog 13 to be moved in an axial and/or a rotational direction relative to body portion 12. The locking dog 13 is provided with a compression spring 14 which encircles the shank portion 25 between the body portion 12 and the head portion 24 of the locking dog 13 biasing it in an upward direction. The locking dog 13 is restricted from upward movement by cylindrical key 15 which is press fitted into a hole formed in the shank portion 25 at its lower end where the said shank portion 25 emerges from the hole formed in body portion 12. The locking dog 13 is urged upward from body portion 12 by spring 14 which causes key 15, when in inoperative position, to rest firmly against the flat lower surface of body portion 12, whereby, generally through friction, the said locking dog is held in said inoperative position to permit securing rings 9 to be placed over lugs 23 (FIG. 5). By rotating locking dog 13 approximately 90° to the operative position (FIG. 7), the key 15, still being urged upward by spring 14 acting against head 24, becomes firmly engaged in keyway 26 formed on the underside of body 12, thereby preventing further rotation of dog 13 and further, providing a positive stop to restrict the upward movement of locking dog 13 by more than a predetermined desired amount. By grasping the elongate head portion 24 and pressing downward against the resilient pressure of spring 14 the locking dog 13 may be returned to the inoperative position shown in FIGS. 4 and 5. It will be seen in FIGS. 7 and 8 that, with the key 15 resting in keyway 26, the elongate head portion 24 is fixed spanwise between lugs 23 and is so formed that there is insufficient clearance between the ends of the elongate head portion 24 and the upwardly extending lugs 23 for securing rings 9 to escape from their respective positions encircling lugs 23.

Figure 8:
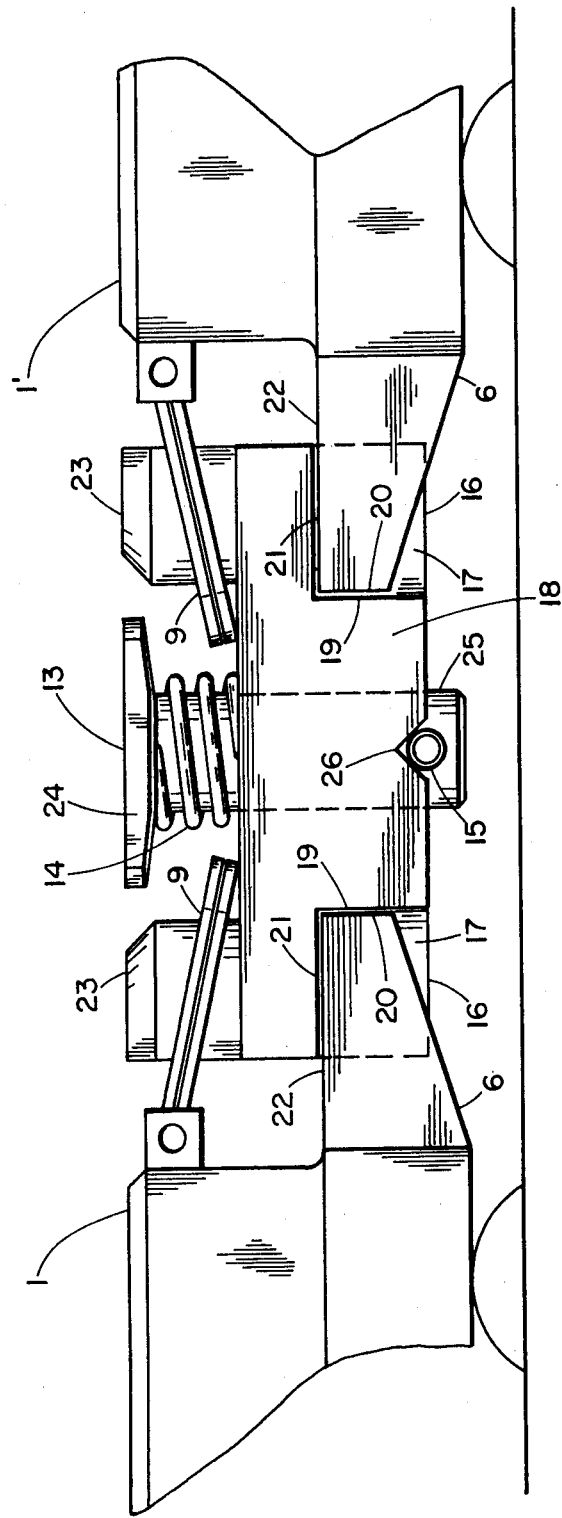
FIG. 8 is a side elevation view of FIG. 7.

FIGS. 7 and 8 show the apparatus disposed in operative arrangement between two pallets 1 and 1' as it would be when the said pallets 1 and 1' are supported on a horizontal roller conveyer 27 wherein all rollers are on a common plane. It will be seen that the oppositely facing projections 16 are in coactive engagement with complementary recesses 7 of tandemly arranged pallets 1 and 1' and that the abutting surfaces 19 of the oppositely facing projections 18 are in coactive engagement with outer edges 20 of the ledge portions 6 of pallets 1 and 1'. It will further be seen that the hingedly mounted securing rings 9 of pallets 1 and 1' have been placed over the lugs 23 and locking dog 13 has been turned from the inoperative position shown in FIGS. 4 and 5 to its operative position with the elongate head portion 24 arranged spanwise between the upwardly extending lugs 23 where it is held in secure alignment by cylindrical key 15 where, being urged upward by compression spring 14, it is in secure engagement with keyway 26.

With the arrangement thus disclosed, it can be readily appreciated that the apparatus is in position to resist any unwanted displacement of the pallets, one to another, which might otherwise result from any individual or combination of adverse forces commonly encountered in the environment in which the apparatus is used. By examining FIGS. 7 and 8, for example, it will be seen that laterally disposed, oppositely directed forces which would tend to misalign the pallets 1 and 1' in a lateral direction, would be immediately reacted by the oppositely extending projections 16, and unwanted lateral displacement of the said pallet, one from the other, would become virtually impossible. It will also be seen that any longitudinally disposed, oppositely directed forces which would tend to reduce the predetermined spatial separation of the pallets 1 and 1' would be immediately reacted by the oppositely extending projectins 18 and reduction of the said space would become virtually impossible and, similarly, any longitudinally disposed, oppositely directed forces which would tend to increase the spatial separation of the pallets 1 and 1' by more than a predetermined desired amount would be immediately reacted by the securing rings 9 acting against lugs 23 and the said increased separation would also become virtually impossible.

Figure 9:
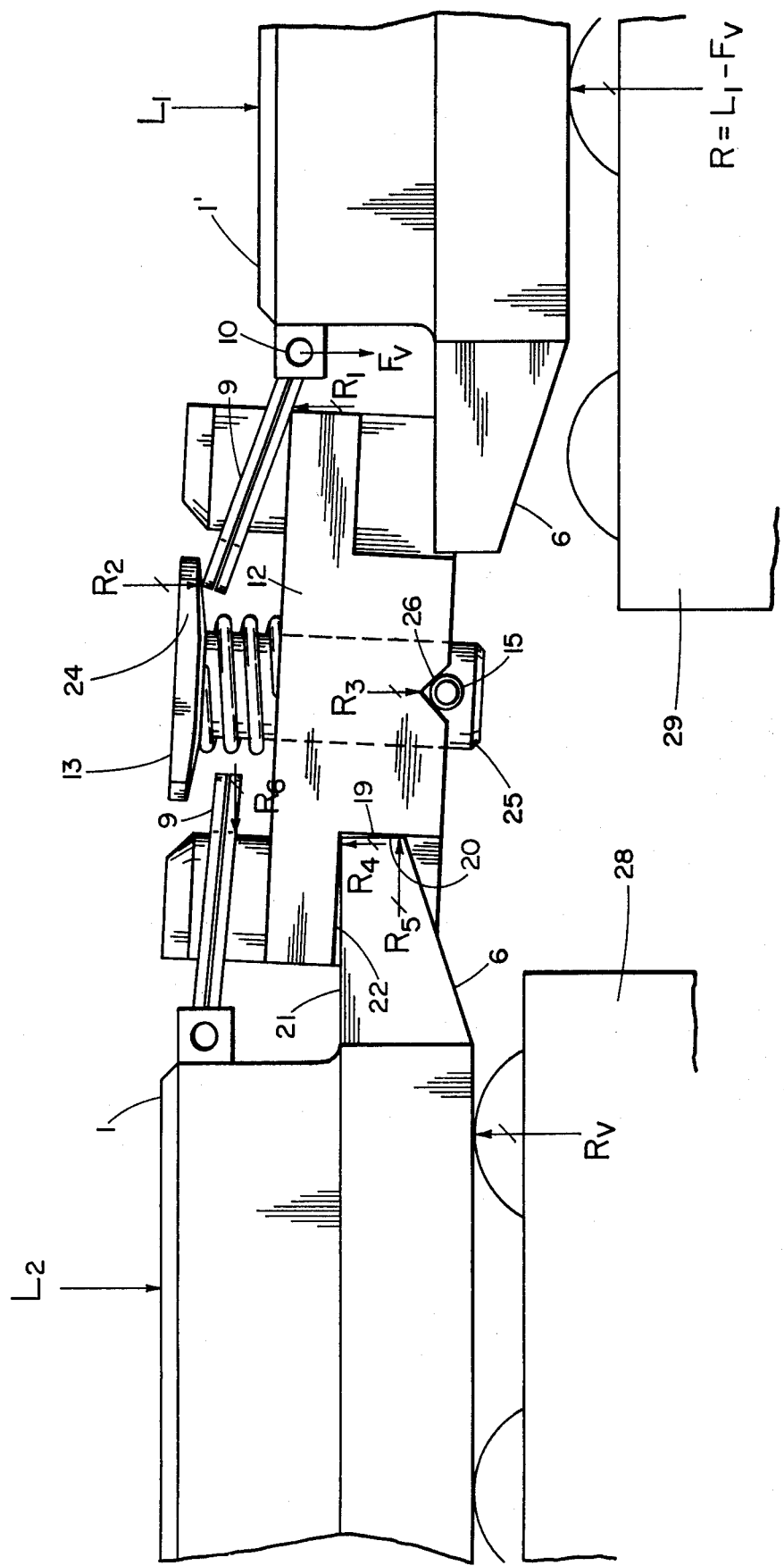
FIG. 9 is a similar side elevation view of FIG. 7 showing the apparatus in operative position as it would be disposed with respect to entrained pallets, with the said pallets being exposed to one type of force commonly encountered in the practice of the invention.

The foregoing discloses the manner in which, when employed for the coupling of pallets such as 1 and 1' to form a train thereof, and subsequently subjected to forces acting through the pallets on a parallel plane to the said pallets, apparatus embodying the invention is operative to prevent the pallets from becoming displaced, one from the other, in the lateral direction, thereby restricting free passage of the entrained pallets between the guide means of the various conveyerized devices over which the entrained pallets must customarily be maneuvered, and/or to prevent the said entrained pallets from experiencing, during maneuvers, an increase or decrease from their initial spaced apart relationship such that, upon being loaded aboard the aircraft, the ledges of the pallets forming the said train are not in the predetermined location to properly coact with the latching devices affixed to the floor of the aircraft. FIG. 9 discloses the manner in which apparatus embodying the invention is operative to preserve the desired relationship of entrained pallets, one to the other, when subjected to forces which act through the pallets in a direction perpendicular to the plane of the said pallets wherein the said forces tend to cause detachment of the pallet(s) from the apparatus, thus permitting the aforesaid parallel forces to destroy the said desired relationship of the said entrained pallets. Such forces commonly occur when pallet trains are transferred from one conveyerized device such as the stationary conveyerized loading platform hereinbefore described, to another conveyerized device such as the self propelled transporting device also hereinbefore described, and/or from the said transporting device to an aircraft. It will be appreciated that the aforesaid conveyerized loading platform, being stationary, is of a fixed height above ground level and is customarily supported on rigid columnar legs. It will also be appreciated that the transporting device, being vehicular in nature, is customarily supported on pneumatic tired wheels, and the aircraft, also being vehicular, is also supported on pneumatic tired wheels and is further supported, between the wheels and the fuselage, on resilient shock absorbing struts. Considering that the total weight of the cargo that could be loaded on a train of pallets can be as high as fifty thousand pounds and that the weight of cargo on any single pallet within the train can be as high as ten thousand pounds, it will be readily appreciated that, as cargo is moved to or from conveyerized devices of the latter type, a vertical displacement of the conveyerized surfaces due to tire and/or strut deflection is virtually unavoidable. A typical vertical displacement condition is shown in FIG. 9. The forces and reactions generated thereby are described below.

Referring to FIG. 9 it will be seen that the apparatus embodying the invention is disposed in operative arrangement between pallets 1 and 1' and that pallets 1 and 1' are being supported by conveying devices 28 and 29 respectively, wherein conveying device 28 is at a higher elevation than conveying device 29 as would generally be the case when transferring loaded, entrained pallets from a rigidly supported conveyer bed such as that customarily found on stationary conveyerized loading apparatus, to a resiliently supported conveyer bed such as that customarily found on transporting apparatus, or from a resiliently supported conveyer bed to a more resiliently supported conveyer bed such as that customarily found in an aircraft equipped as hereinbefore described.

For purposes of illustration it will be assumed that conveyer bed 28 is supported on a stationary pallet loading apparatus and conveyer bed 29 is supported on a transporting apparatus; the movement of the pallet train is from left to right in FIG. 9 and at least one loaded pallet (in this case pallet 1') has been transferred to conveyer bed 29 whereby said conveyer bed 29, being resiliently supported has deflected downward with respect to conveyer bed 28 which is supporting loaded pallet 1. It will be seen that the load $L_1$ bearing downward on pallet 1' has caused a downward force $F_v$ to be generated at pintle 10 which is reacted by a couple formed by securing ring 9 bearing downward on body portion 12 at $R_1$ and upward on locking dog 13 at $R_2$ and since locking dog 13 is slidably mounted in body portion 12 the downward reaction $R_2$ is transported through the head portion 24 and shank portion 25 of locking dog 13 to cylindrical key 15 which bears upward on body portion 12 in keyway 26 at $R_3$ preventing unwanted upward movement of locking dog 13, whereby it may be said that the reacting couple has been transposed to $R_1R_3$. With equilibrium between the securing ring 9 and the coupling apparatus thus established, the force $F_v$ is transmitted through the body portion 12 to where it is reacted at $R_4$ by surface 21 of the said body portion 12 bearing on the upper face 22 of ledge portion 6. The moment thus created around $R_4$ is reacted by a couple formed by surface 19 of body portion 12 bearing at $R_5$ against the outer edge 20 of ledge portion 6, and securing ring 9 bearing at $R_6$ against the upwardly extending lug 23. The force $F_v$ is hence transmitted to pallet 1 where it is reacted by pallet 1 bearing on conveying device 28 at $R_v$. The resulting moment created around $R_v$ is reacted generally by the load $L_2$ bearing on pallet 1 thereby establishing equilibrium within the system.

In FIG. 9 pallet 1' is shown in intimate contact with the rollers on conveying device 29 such that if conveying device 29 were to be considered as rigidly supported, the load $L_1$ bearing on pallet 1' could be considered as being totally reacted by the rollers on conveying device 29, and the force $F_v$ and the reactions $R_1$ and $R_2$ would hence not exist. Conveying device 29 is, however, mounted on resilient supports (e.g., pneumatic tires) and therefore has a springlike quality whereby the degree of downward deflection of the said device 29 bears a direct relationship with the magnitude of the load that is placed thereon. It can be appreciated, therefore, that as loaded pallets comprising a train are transferred from one device to another, such as 28 to 29 wherein the latter device has greater resilience than the former, an ever increasing lowering of the latter device away from the former takes place. It can also be appreciated that, as the said lowering takes place, the forward pallet 1' drops below the level of the trailing pallet 1 leaving the coupling apparatus suspended on the trailing pallet 1, thereby creating reaction $R_4$ and couple $R_5$-$R_6$ of very small magnitude. As the lowering of the forward pallet 1' continues, the securing ring 9, being hingedly mounted, pivots clockwise about the fulcrum at $R_1$ until contact is made at $R_2$ whereupon, acting as a couple, $R_1$ and $R_2$ resist further downward movement of pintle 10 attached to the forward pallet 1' thereby creating the force $F_v$ which is equal in magnitude to the load $L_1$ minus that portion of $L_1$ which is supported by the resiliently mounted conveying device 29. It will be appreciated that this process is compounded when a transfer is made from one device to another wherein both devices are resiliently supported. Such a case would be encountered when a plurality of entrained pallets are being transferred from a transporting apparatus of the type heretofore described to an aircraft also of a type heretofore described. In this case both conveying devices are resiliently supported, the latter more so than the former since in addition to tires the support is provided through resilient shock absorbing struts affixed between the wheels and the fuselage. It will be realized that before the transfer takes place the entire loaded pallet train is carried by the transporting vehicle and the conveying device on which the pallet train is supported is in a downwardly deflected condition. As the load is transferred therefrom, the tendency of the said conveying device is to rise and, considering that while the transporter supported device is rising the aircraft supported device is lowering, conditions can occur, particularly after most of the loaded pallets have been transferred, whereby a pallet may be entirely supported at one end by the securing ring coacting as shown in FIG. 9 with the coupling apparatus. It should be noted here that the transporting device is customarily provided with means whereby the operator may adjust the elevation of the conveying device in order to compensate for such conditions as tire and strut deflection. Such adjustment is customarily made when preparing to make a transfer in order to place the transporter conveying device at an elevation at least equal to the aircraft device (which may be at a maximum). Customarily the operator, after making the initial adjustment, attempts to minimize the differences in elevation of the two devices as the load is transferred. It has not, however, been proven to be within the range of the skill of the operator or the inherent capability (response time, etc.) of the equipment to eliminate the vertical displacement conditions heretofore described.

The invention provides for resisting detachment from the pallet(s) under still another set of conditions which are brought about by forces developed by the vertical displacement described above acting through a securing ring 9 which has become distorted. It is common in the industry to transport large, heavy pieces of machinery such as aircraft engines. It is customary, when securing items such as engines, to use conventional chain and chain tensioning gear, such as turnbuckles, to secure the said items to the pallets. It is also customary for the tensioning gear, such as a turnbuckle, to be hooked at the pallet end of the chain instead of the load end for ease of access. It is thus a frequent fault with the securing rings 9 to evidence distortion in the form of a twist extending outward from pintle 10 which remains fixed on its original axis and caused by turning the turnbuckle to tighten the chain. When a securing ring evidencing such distortion is subjected to the conditions heretofore described and shown in FIG. 9, the upward bearing of the securing ring 9 against the head portion 24 of locking dog 13, being biased by the twist, tends, in cam like fashion, to impart a rotational as well as an upward force on the said locking dog 13. The locking dog 13, however, is prevented from rotating and thereby releasing the securing ring and allowing the pallet to become detached by the provision of keyway 26 into which cylindrical key 15 is firmly seated. As a matter of fact, it can be said that the upward bearing force of the securing ring 9 against the locking dog 13 creates a self-regulating system since the greater the upward, and hence rotational, force becomes the greater the resistance to rotation becomes.

It will be seen that the invention provides an extremely reliable coupling apparatus which permits the coupling of cargo pallets to form trains thereof whereby the weight of the cargo placed thereon can be at a maximum permitted by the pallets or the aircraft on which the entrained, loaded pallets are to be transported and whereby the pallets may be moved along and transferred between all apparatuses customarily employed for the handling of such entrained loaded pallets without the pallets becoming detached and misplaced from the desired spatial relationship, one from the other, so as to inhibit movement to, and into the aircraft and the securing thereof within the aircraft.

Having disclosed the manner in which the said coupling is accomplished, I claim:

1. In a coupling apparatus for releasably interconnecting cargo pallets to form trains thereof for movement along and transfer between conveyerized apparatus, said pallets being provided with frame members comprising a ledge portion and an upper edge portion, said ledge portion being provided with a plurality of spaced apart rectangular recesses each having a pair of vertically disposed, inwardly facing abutting surfaces formed therein, said upper edge portion being provided with hingedly mounted securing rings in coacting arrangement with said rectangular recesses, said coupling apparatus being provided with spacing means adapted to abut the facing outer edges of the ledge portions of said tandemly arranged pallets, horizontally disposed resting surfaces adapted to overlie portions of the ledge portion of said pallets and longitudinally arranged, upwardly extending lugs adapted to be engaged by the securing rings of said tandemly arranged pallets to effect the coupling thereof, the improvements comprising oppositely extending projections to coactively engage the said pairs of vertically disposed, inwardly facing abutting surfaces of the said recesses of adjacent, tandemly arranged pallets, the said engagement being operative to prevent lateral displacement of the said pallets one from the other, and locking means adapted to coact with said upwardly extending lugs, said coaction being operable to prevent disengagement of said securing rings under all conditions encountered during the said movement and transfer of the said pallet trains.

2. The invention in claim 1 wherein the oppositely extending projections are disposed at right angles to and midway along the said spacing means and the said overlying horizontally disposed resting surfaces, whereby the said spacing means abut the outer edges of the said ledges at each side of the said rectangular recesses and whereby the said resting surfaces overlie the said ledges at each side of the said recesses of said tandemly arranged pallets, the said resting surfaces thereby being operative to coact with said locking means and said spacing means to maintain said oppositely extending projections in coacting relationship with said interconnected pallets during all conditions encountered during the said movement and transfer of the said pallet trains.

3. The invention in claim 1 whereby the said locking means comprises a generally T-shaped locking dog having an elongate head portion and a cylindrical shank portion, means movably mounting said head portion and said shank portion between lock and release position, said head portion being adapted, when in lock position, to lie spanwise between the said longitudinally arranged upwardly extending lugs thereby capturing said securing rings, and means, cooperable through said shank portion, preventing upward or rotational movement of said head portion caused by forces and combinations of forces generated during the said movement and transfer of the said pallet trains.

4. The invention in claim 3 whereby the means preventing upward or rotational movement of the said locking dog as a result of forces applied thereto comprises a key affixed to the said cylindrical shank portion at the opposite end from the said head portion and a keyway coacting with said key to prevent said upward or rotational movement of said locking dog, said keyway being formed in the said body portion of the said coupling apparatus.

5. The invention in claim 4 including a compression spring encircling the shank portion of the said locking dog between the head portion and the coupler body portion, said spring being operable to bias the said locking dog in an upward direction to maintain the said locking dog in operative position at times when upwardly directed pallet forces are not placed thereon.

6. The invention in claim 5 wherein the said spring is also operable to constrain the said locking dog in inoperative, release position.

7. A coupling apparatus for releasably interconnecting cargo pallets to form trains thereof, said pallets being provided with frame members comprising a ledge portion and an upper edge portion, said ledge portion being provided with a plurality of spaced apart rectangular recesses having vertically disposed inwardly facing abutting surfaces formed therein and said upper edge portion being provided with hingedly mounted securing rings in coacting arrangement with said rectangular recesses, said coupling apparatus comprising, in combination, a body portion and a locking portion, said body portion having a first pair of oppositely extending projections, said projections each having a pair of parallel abutting surfaces adapted to coactively engage the facing outer edges of the ledge portions of adjacent tandemly arranged pallets at either side of the rectangular recesses of said pallets; a second pair of oppositely extending projections arranged perpendicularly to the said first pair, said second pair of projections each having a pair of oppositely facing abutting surfaces adapted to coact with the inwardly facing surfaces of the said rectangular recesses of adjacent tandemly arranged pallets; a plurality of surfaces arranged in mutually perpendicular relationship to the abutting surfaces of said first and second pairs of projections, said surfaces adapted to overlie the said ledge portions of adjacent tandemly arranged pallets at each side of the recesses thereof thereby maintaining said first and second pairs of projections in coactive engagement with said tandemly arranged pallets; and a pair of longitudinally arranged, upwardly extending lugs adapted to be engaged by the securing rings of said tandemly arranged pallets to effect the coupling thereof, and said locking portion comprising a generally T-shaped locking dog having an elongate head portion and a cylindrical shank portion, means movably mounting said head portion and said shank portion between lock and release positions, said head portion being adapted, when in lock position, to lie spanwise between the said longitudinally arranged, upwardly extending lugs thereby capturing said securing rings in coactive engagement with said lugs, and means coacting through said shank portion preventing upward or rotational movement of said head portion, said means comprising a key affixed to the said shank portion coacting with a keyway formed on the underside of the said body portion, and spring means maintaining said key in coacting relationship with said keyway when in lock position.

8. In a coupling apparatus for releasably interconnecting cargo pallets to form trains thereof, said pallets being provided with frame members comprising a ledge portion and an upper edge portion, said ledge portion being provided with a plurality of spaced apart rectangular recesses each having vertically disposed, inwardly facing abutting surfaces formed therein, said upper edge portion being provided with hingedly mounted securing rings in coacting arrangement with said rectangular recesses, said coupling apparatus being provided with spacing means adapted to abut the facing outer edges of the ledge portions of tandemly arranged pallets, and upwardly extending lugs adapted to be engaged by the securing rings of said tandemly arranged pallets to effect the coupling thereof, the improvements comprising in combination, a pair of oppositely extending projections arranged perpendicularly to the said spacing means, said projections each having a pair of oppositely facing abutting surfaces adapted to coact with the inwardly facing surfaces of the said rectangular recesses of adjacent tandemly arranged pallets; a plurality of surfaces arranged in mutually perpendicular relationship to the abutting surfaces of said projections and said spacing means, said surfaces adapted to overlie the said ledge portions of adjacent tandemly arranged pallets at each side of the recesses thereof thereby maintaining said projections and said spacing means in coactive engagement with said tandemly arranged pallets, and locking means adapted to coact with said upwardly extending lugs, said coaction being operable to prevent disengagement of said securing rings, said locking portion comprising a generally T-shaped locking dog having an elongate head portion and a cylindrical shank portion, means movably mounting said head portion and said shank portion between lock and release positions, said head portion being adapted, when in lock position, to lie spanwise between the said longitudinally arranged, upwardly extending lugs thereby capturing said securing rings in coactive engagement with said lugs, and means coacting through said shank portion preventing upward or rotational movement of said head portion, said means comprising a key affixed to the said shank portion coacting with a keyway formed on the underside of the said body portion, and spring means maintaining said key in coacting relationship with said keyway when in lock position.

* * * * *